(12) United States Patent
Tsujishita

(10) Patent No.: US 11,029,636 B2
(45) Date of Patent: Jun. 8, 2021

(54) GEAR MECHANISM INCLUDING GEAR AND BEARING PORTION HAVING NOTCHED PORTION, AND IMAGE FORMING APPARATUS PROVIDED WITH THE SAME

(71) Applicant: BROTHER KOGYO KABUSHIKI KAISHA, Nagoya (JP)

(72) Inventor: Yoji Tsujishita, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/780,010

(22) Filed: Feb. 3, 2020

(65) Prior Publication Data

US 2020/0249621 A1  Aug. 6, 2020

(30) Foreign Application Priority Data

Feb. 4, 2019  (JP) .............................. JP2019-018200

(51) Int. Cl.
   *G03G 21/16* (2006.01)
   *F16H 57/04* (2010.01)
   *F16H 1/20* (2006.01)

(52) U.S. Cl.
   CPC ........... *G03G 21/1647* (2013.01); *F16H 1/20* (2013.01); *F16H 57/0464* (2013.01)

(58) Field of Classification Search
   CPC ............. G03G 15/757; G03G 15/0935; G03G 15/1615; G03G 21/1647; G03G 21/1857; G03G 2221/1657
   See application file for complete search history.

(56) References Cited

U.S. PATENT DOCUMENTS

2011/0206438 A1  8/2011  Igarashi et al.
2015/0369338 A1  12/2015  Sugita et al.

FOREIGN PATENT DOCUMENTS

| JP | 8-248717 A | 9/1996 |
| JP | 9-242851 A | 9/1997 |
| JP | 2011-174577 A | 9/2011 |
| JP | 2016-9018 A | 1/2016 |

*Primary Examiner* — Thomas S Giampaolo, II
(74) *Attorney, Agent, or Firm* — Merchant & Gould P.C.

(57) ABSTRACT

A gear mechanism includes: at least one gear including a rotation shaft; and at least one bearing portion. The at least one gear can meshingly engage with another gear that applies a force to the at least one gear. The at least one bearing portion includes: a collar portion supporting the rotation shaft; and a notched portion exposing a portion of the rotation shaft to an outside. A first imaginary plane defines a first region and a second region of the at least one bearing portion. The first imaginary plane extends in an axial direction and contains a first linear line passing through a center of the rotation shaft and perpendicular to a direction of a line of action of the force. The first region is positioned downstream of the first linear line in the direction of the line of action. The notched portion is formed in the second region.

11 Claims, 11 Drawing Sheets

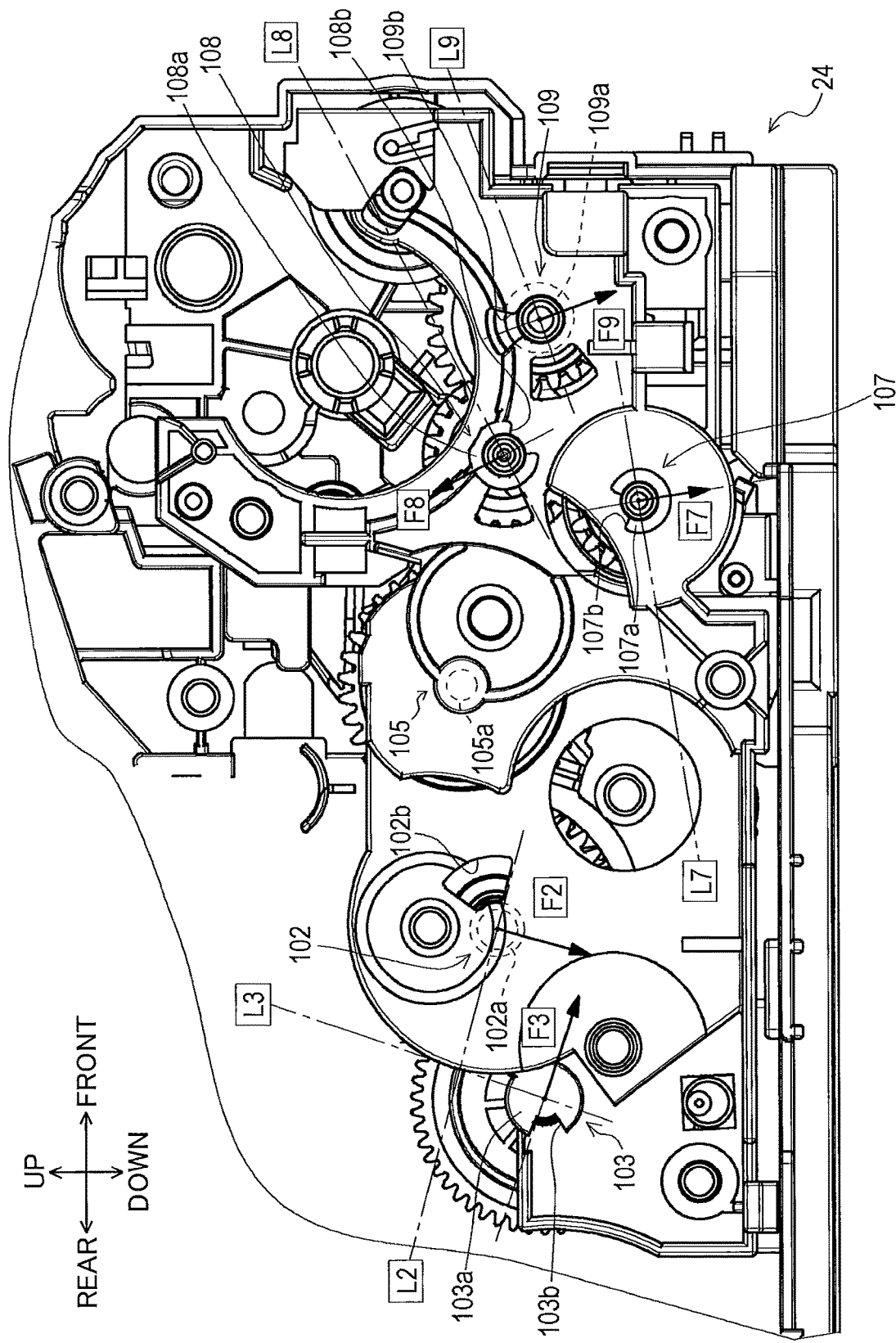

GEAR MECHANISM INCLUDING GEAR AND BEARING PORTION HAVING NOTCHED PORTION, AND IMAGE FORMING APPARATUS PROVIDED WITH THE SAME

CROSS REFERENCE TO RELATED APPLICATION

This application claims priority from Japanese Patent Application No. 2019-018200 filed Feb. 4, 2019. The entire content of the priority application is incorporated herein by reference.

TECHNICAL FIELD

The present disclosure relates to a gear mechanism, and an image forming apparatus provided with the gear mechanism.

BACKGROUND

In a gear mechanism including gears and bearings supporting rotation shafts of the corresponding gears, there is conventionally known a configuration in which grease is applied to each rotation shaft and each bearing. Japanese Patent Application Publication No. 2011-174577 discloses one example of such a gear mechanism included in an image forming apparatus. The gear mechanism includes a pendulum gear a bearing. In a configuration in Japanese Patent Application Publication No. 2011-174577, a grease retaining portion is formed at a portion to which a load is applied when the pendulum gear rotates. Grease is applied to the bearing and the grease retaining portion.

SUMMARY

When assembling such a conventional gear mechanism, generally, the gears are assembled into the gear mechanism after grease has been applied to the bearings and the rotation shafts of the gears. However, in a case where a large number of gears are provided in the gear mechanism, it requires a lot of time and effort to apply grease to each of the gears and assemble the gears with each other. In order to reduce man-hour for assembling the gear mechanism, it is preferable that grease is applied to the bearings and the rotation shafts after assembling the gear mechanism, rather than applying grease to each component prior to assembling the gear mechanism.

However, according to the existing gear mechanism constituting the image forming apparatus, a lot of gears are shielded or covered by a gear cover or a frame in a state where the gear mechanism is assembled. In such a case, once the gear mechanism has been assembled, applying grease to the bearings and the rotation shafts of the shielded or covered gears is no longer possible. Under such circumstances, in the conventional gear mechanism, it is difficult to employ such a configuration where grease is applied to the bearings and the rotation shafts of the gears at once after the gears are assembled into the gear mechanism.

In view of the foregoing, it is an object of the disclosure to provide a gear mechanism in which grease can be applied to components after gears are assembled, and an image forming apparatus provided with the gear mechanism.

In order to attain the above and other object, according to one aspect, the disclosure provides a gear mechanism including: at least one gear; and at least one bearing portion. The at least one gear includes a gear body and a rotation shaft extending in an axial direction. The at least one gear is capable of meshing engagement with another gear. A force is applied to the at least one gear from the another gear due to the meshing engagement with the another gear. The at least one bearing portion includes: a collar portion; and a notched portion. The collar portion allows the rotation shaft to be inserted therethrough to rotatably support the rotation shaft. The notched portion allows a portion of the rotation shaft to be exposed to an outside. The notched portion is formed by partially cutting away the collar portion. The at least one bearing portion has a first region and a second region opposite the first region with respect to a first imaginary plane. The first region and the second region are defined by dividing the bearing portion by the first imaginary plane. The first imaginary plane extends in the axial direction and contains a first linear line. The first linear line passes through a center of the rotation shaft inserted through the collar portion and is perpendicular to a direction of a line of action of the force. The first region is positioned downstream of the first linear line in the direction of the line of action of the force. The notched portion is formed in the second region.

According to another aspect, the disclosure provides an image forming apparatus including: an image forming unit; a frame supporting the image forming unit; and a gear mechanism provided on the frame. The gear mechanism includes: at least one gear; and at least one bearing portion. The at least one gear includes a gear body and a rotation shaft extending in an axial direction. The at least one gear is capable of meshing engagement with another gear. A force is applied to the at least one gear from the another gear due to the meshing engagement with the another gear. The at least one bearing portion includes: a collar portion; and a notched portion. The collar portion allows the rotation shaft to be inserted therethrough to rotatably support the rotation shaft. The notched portion allows a portion of the rotation shaft to be exposed to an outside. The notched portion is formed by partially cutting away the collar portion. The at least one bearing portion has a first region and a second region opposite the first region with respect to a first imaginary plane. The first region and the second region are defined by dividing the bearing portion by the first imaginary plane. The first imaginary plane extends in the axial direction and contains a first linear line. The first linear line passes through a center of the rotation shaft inserted through the collar portion and is perpendicular to a direction of a line of action of the force. The first region is positioned downstream of the first linear line in the direction of the line of action of the force. The notched portion is formed in the second region.

According to still another aspect, the disclosure provides a gear mechanism including: a first gear; a second gear; and a first bearing portion. The first gear includes a first gear body and a first rotation shaft extending in an axial direction. The second gear includes a second gear body and a second rotation shaft extending in the axial direction. The second gear is capable of meshing engagement with the first gear. A force is applied to the first gear from the second gear due to the meshing engagement with the second gear. The first bearing portion includes: a first collar portion; and a first notched portion. The first collar portion allows the first rotation shaft to be inserted therethrough to rotatably support the first rotation shaft. The first notched portion allows a portion of the first rotation shaft to be exposed to an outside. The first notched portion is formed by partially cutting away the first collar portion. The first bearing portion has a first region and a second region opposite the first region with respect to a first imaginary plane. The first region and the second region are defined by dividing the first bearing portion by the first imaginary plane. The first imaginary plane extends in the axial direction and contains a first linear line. The first linear line passes through a center of the first rotation shaft inserted through the first collar portion and is perpendicular to a direction of a line of action of the force. The first region is positioned downstream of the first linear line in the direction of the line of action of the force. The first notched portion is formed in the second region.

According to still another aspect, the disclosure provides an image forming apparatus including: an image forming unit; a frame supporting the image forming unit; and a gear mechanism provided on the frame. The gear mechanism includes: a first gear; a second gear; and a first bearing portion. The first gear includes a first gear body and a first rotation shaft extending in an axial direction. The second gear includes a second gear body and a second rotation shaft extending in the axial direction. The second gear is capable of meshing engagement with the first gear. A force is applied to the first gear from the second gear due to the meshing engagement with the second gear. The first bearing portion includes: a first collar portion; and a first notched portion. The first collar portion allows the first rotation shaft to be inserted therethrough to rotatably support the first rotation shaft. The first notched portion allows a portion of the first rotation shaft to be exposed to an outside. The first notched portion is formed by partially cutting away the first collar portion. The first bearing portion has a first region and a second region opposite the first region with respect to a first imaginary plane. The first region and the second region are defined by dividing the first bearing portion by the first imaginary plane. The first imaginary plane extends in the axial direction and contains a first linear line. The first linear line passes through a center of the first rotation shaft inserted through the first collar portion and is perpendicular to a direction of a line of action of the force. The first region is positioned downstream of the first linear line in the direction of the line of action of the force. The first notched portion is formed in the second region.

BRIEF DESCRIPTION OF THE DRAWINGS

The particular features and advantages of the embodiment (s) as well as other objects will become apparent from the following description taken in connection with the accompanying drawings, in which:

FIG. 8 is a view for description of a relationship between notched portions and resultant forces applied to the gears in the gear mechanism according to the embodiment;

DETAILED DESCRIPTION

Hereinafter, one embodiment of the present disclosure will be described while referring to the accompanying drawings.

<Overall Configuration of Image Forming Apparatus>

Figure 1:
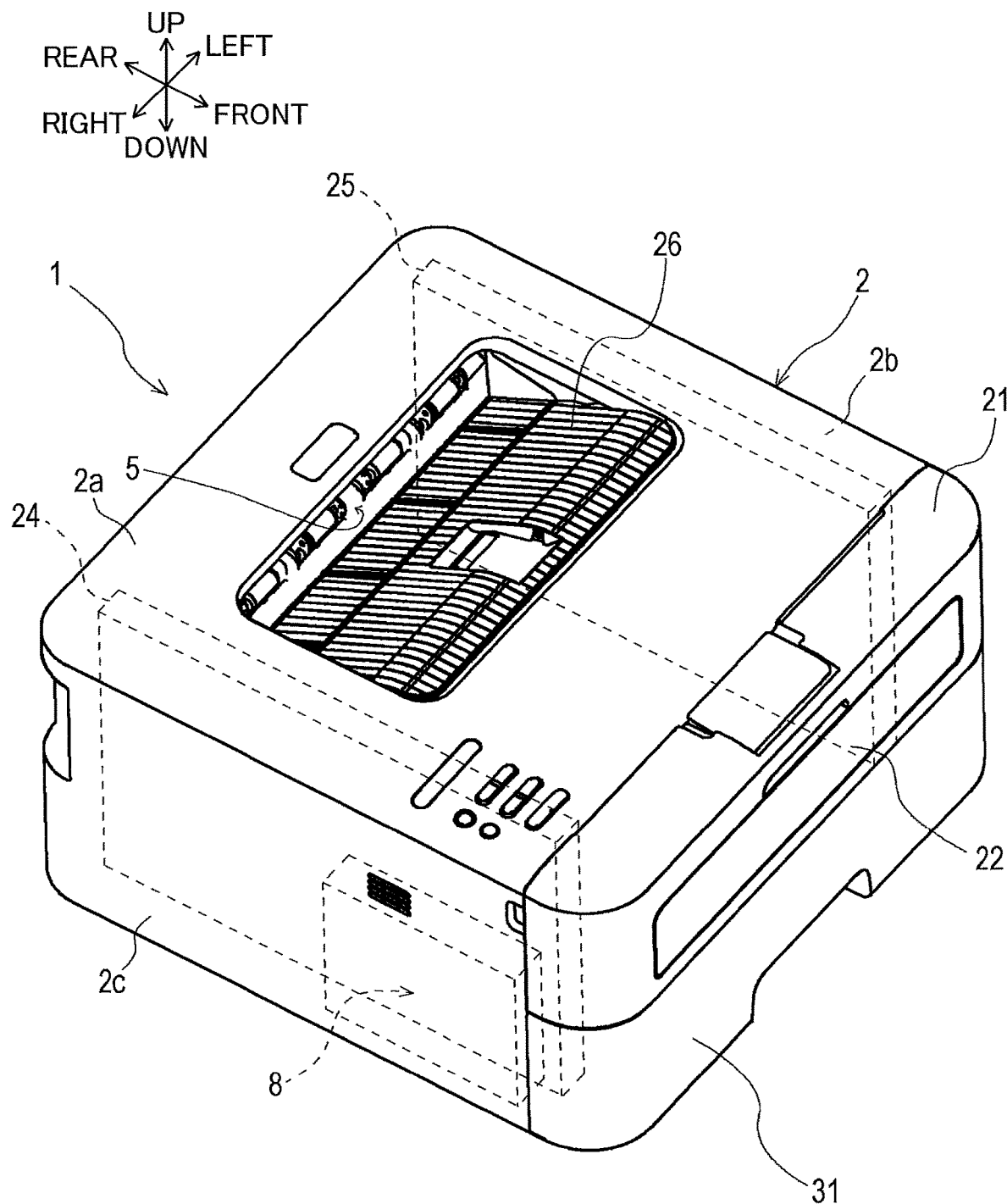
FIG. 1 is a perspective view illustrating an overall configuration of an image forming apparatus according to one embodiment of the present disclosure.
Figure 2:
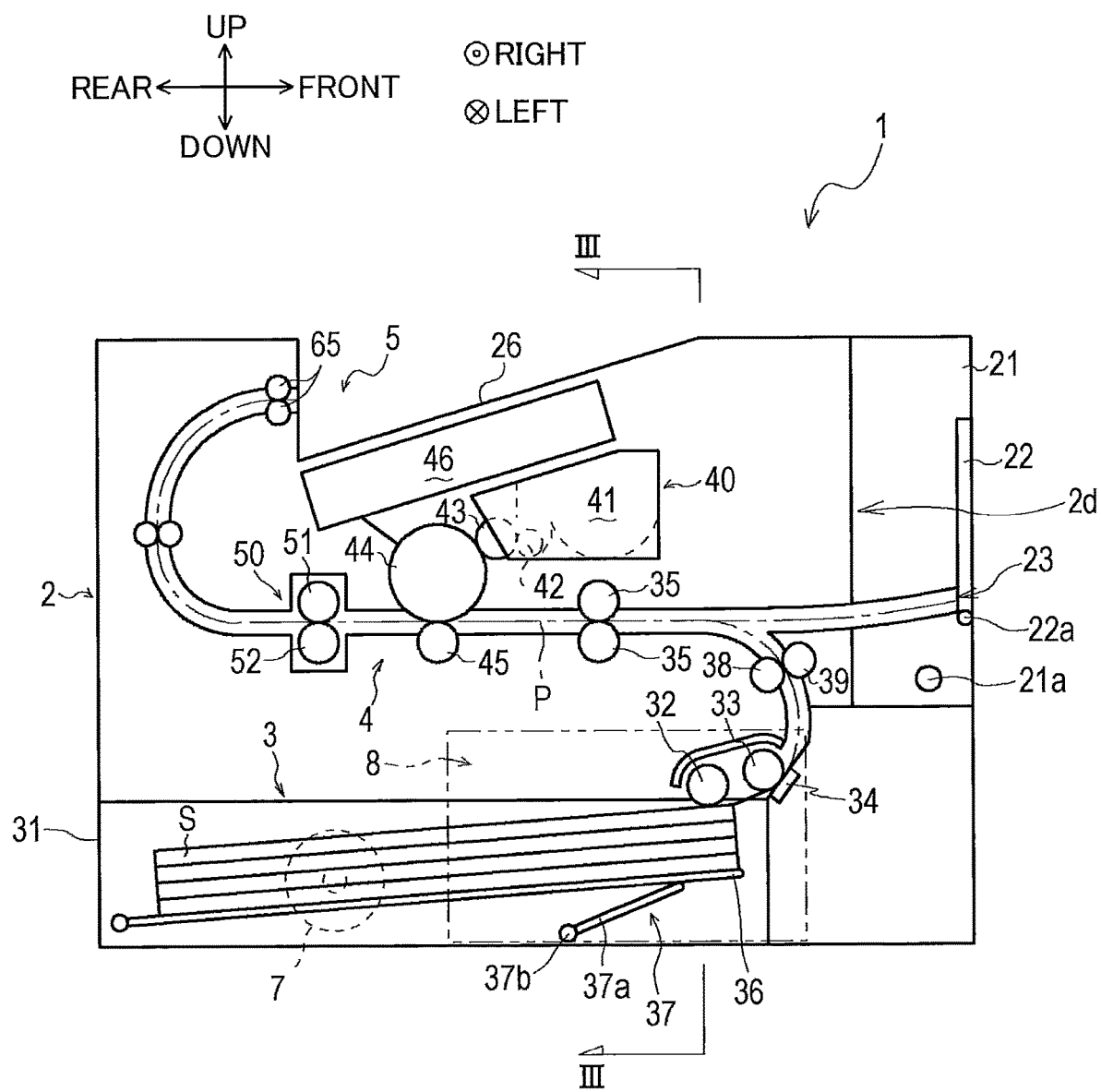
FIG. 2 is a schematic left side view of the image forming apparatus according to the embodiment.

As illustrated in FIGS. 1 and 2, an image forming apparatus 1 according to the embodiment includes a housing 2, a sheet supply unit 3, an image forming unit 4, a discharge unit 5, a motor 7, and a gear mechanism 8.

In the following description, the terms "up", "down", "right", "left", "front", "rear" and the like will be used on a basis of directions in FIG. 2. That is, a right side and a left side in FIG. 2 will be defined as a front side and a rear side of the image forming apparatus 1, respectively; a Near side and a far side in FIG. 2 will be defined as a right side and a left side of the image forming apparatus 1, respectively; and an upper side and a lower side in FIG. 2 will be defined an upper side and a lower side of the image forming apparatus 1, respectively.

The housing 2 is a box having a substantially rectangular parallelepiped shape and constitutes an outer shell of the image forming apparatus 1. The housing 2 includes a top plate 2a, a left side plate 2b, and a right side plate 2c, and is formed with an opening 2d opening frontward. The housing 2 accommodates therein the sheet supply unit 3 and the image forming unit 4.

In an interior of the housing 2, a right side frame 24 and a left side frame 25 stand on a right side portion and a left side portion, respectively, to support the housing 2 in cooperation with each other. A space A (see FIG. 3) is defined between the right side plate 2c and the right side frame 24. The housing 2 has an upper surface constituting a discharge tray 26. The discharge tray 26 is recessed so as to be sloped downward in the rearward direction.

The image forming apparatus 1 further includes a front cover 21 configured to open and close the opening 2d. The front cover 21 has a lower end portion at which a pivot shaft 21a is provided. The front cover 21 is pivotally movable about the pivot shaft 21a between a closed position closing the opening 2d and an open position opening the opening 2d.

The front cover 21 includes a manual insertion slot 23 allowing sheets S to be manually inserted therethrough, and a manual insertion slot cover 22 for opening and closing the manual insertion slot 23. The manual insertion slot cover 22 has a lower end portion at which a pivot shaft 22a is provided. The manual insertion slot cover 22 is pivotally movable about the pivot shaft 22a between a closed position closing the manual insertion slot 23 and an open position opening the manual insertion slot 23.

The sheet supply unit 3 is configured to supply sheets S to the image forming unit 4. The sheet supply unit 3 includes a sheet cassette 31, a sheet supply roller 32, a separation roller 33, a separation pad 34, a pair of registration rollers 35, and a pair of conveyer rollers 38, 39. A conveying passage P is defined inside the housing 2 from the sheet cassette 31 to the discharge tray 26 through the image forming unit 4.

The sheet supply unit 3 also includes a support plate 36 configured to support the sheets S, and a lifter plate 37 configured to adjust a height of the support plate 36. The lifter plate 37 includes a lift plate 37a having a plate-like shape, and a shaft portion 37b for pivotally movably supporting the lift plate 37a. In accordance with angular rotation of the shaft portion 37b, the lift plate 37a is pivotally moved to alter an inclination angle thereof, thereby changing the height of the support plate 36.

The sheet cassette 31 is configured to accommodate a stack of sheets S therein. The sheets S accommodated in the sheet cassette 31 are let out by the sheet supply roller 32 toward the separation roller 33, and one sheet S is separated from the remaining sheets S by the separation roller 33 and the separation pad 34 so that the sheets S are delivered onto the conveying passage P one by one.

The sheet S delivered onto the conveying passage P is conveyed toward the image forming unit 4 by the pair of conveyer rollers 38 and 39 and the pair of registration rollers 35 those positioned downstream of the separation roller 33 in a conveying direction. The pair of registration rollers 35 is configured to temporarily stop movement of a leading end of the sheet S and then convey each sheet S to an image transferring position in the image forming unit 4 at a prescribed timing.

The image forming unit 4 is configured to form an image on the sheet S. The image forming unit 4 is disposed at a position above the sheet cassette 31. The image forming unit 4 includes a process cartridge 40 configured to transfer an image on a surface of the sheet S conveyed from the sheet supply unit 3, an exposure unit 46 configured to expose an outer circumferential surface of a photosensitive drum 44 of the process cartridge 40 to light, and a fixing unit 50 configured to fix the image transferred onto the sheet S to the sheet S.

The process cartridge 40 includes a developing agent accommodating chamber 41, a supply roller 42, a developing roller 43, the photosensitive drum 44, and a transfer roller 45.

The exposure unit 46 includes a laser diode, a polygon mirror, lenses, and reflection mirrors etc. The exposure unit 46 is configured to irradiate the photosensitive drum 44 with laser beam in accordance with image data inputted into the image forming apparatus 1, whereby the outer circumferential surface of the photosensitive drum 44 is exposed to light.

The photosensitive drum 44 is positioned adjacent to the developing roller 43. The outer circumferential surface of the photosensitive drum 44 is uniformly charged with positive polarity by a charger (not illustrated), and is exposed to the light. A region of the photosensitive drum 44 exposed to light by the exposure unit 46 has an electric potential lower than that of another region of the photosensitive drum 44 that is not exposed to light, whereby an electrical latent image based on the image data is formed on the outer circumferential surface of the photosensitive drum 44. As toner that is positively charged is supplied from the developing roller 43, the electrostatic latent image becomes visible as a developing agent image.

The transfer roller 45 is positioned to face the photosensitive drum 44. A negative transfer bias is applied to the transfer roller 45 by a bias application unit (not illustrated). In a state where the transfer bias is applied to an outer circumferential surface of the transfer roller 45, the sheet S is conveyed while being nipped between the transfer roller 45 and the photosensitive drum 44 (i.e., the image transfer position). As a result, the developing agent image formed on the outer circumferential surface of the photosensitive drum 44 is transferred onto the surface of the sheet S.

The fixing unit 50 includes a heat roller 51 and a pressure roller 52. The heat roller 51 is driven by a driving force supplied from the motor 7 to rotate, an is heated by electric power supplied from a power source (not illustrated). The pressure roller 52 faces and in intimate contact with the heat roller 51 to be rotated following rotation of the heat roller 51. The sheet S on which the developing agent image is transferred is conveyed to the fixing unit 50 and is nipped between the heat roller 51 and the pressure roller 52. As a result, the developing agent image is fixed to the sheet S.

The discharge unit 5 includes a pair of discharge rollers 65, and is configured to discharge the sheet S conveyed from the fixing unit 50 to an outside of the housing 2. Specifically, the sheet S conveyed from the fixing unit 50 is discharged onto the discharge tray 26 by the pair of discharge rollers 65.

The motor 7 is an example of a drive source for driving the image forming unit 4 and the like. Each component provided in the image forming apparatus 1 is driven by the motor 7 through the gear mechanism 8.

<Gear Mechanism>

Figure 3:
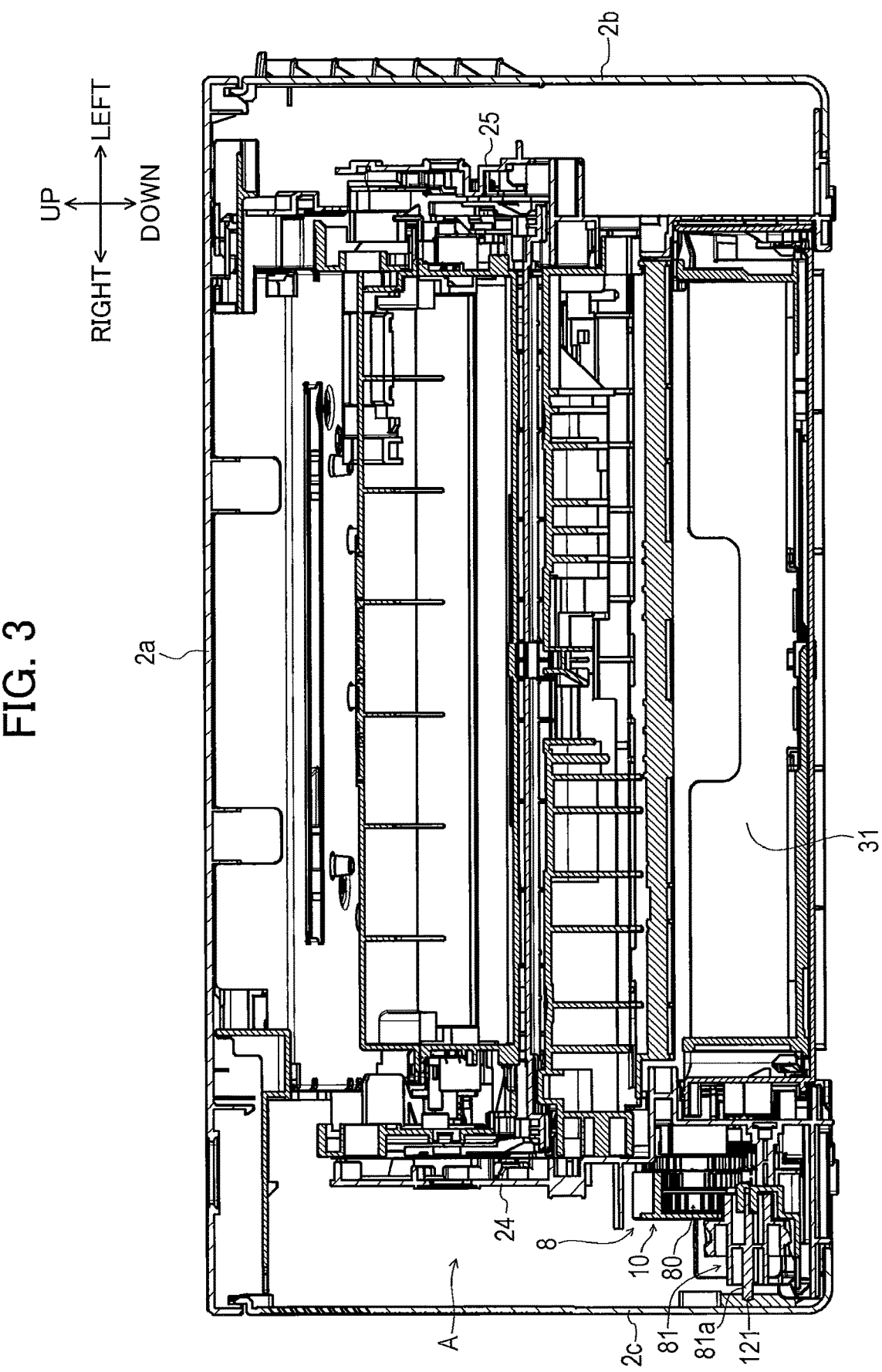
FIG. 3 is a cross-sectional view taken along a line III-III in FIG. 2.

The gear mechanism 8 is configured to transmit a driving force outputted from the motor 7 by rotation of the motor 7 to the sheet supply roller 32 and the lifter plate 37. As illustrated in FIG. 3, the gear mechanism 8 includes a gear cover 10 and a gear train 80. The gear mechanism 8 is positioned within the space A defined between the right side plate 2c that constitutes the housing 2 and the right side frame 24.

The gear cover 10 is positioned within the space A, and is fixed to a right side surface of the right side frame 24. The gear cover 10 is configured to rotatably support a plurality of gears in the gear mechanism 8.

Figure 6:
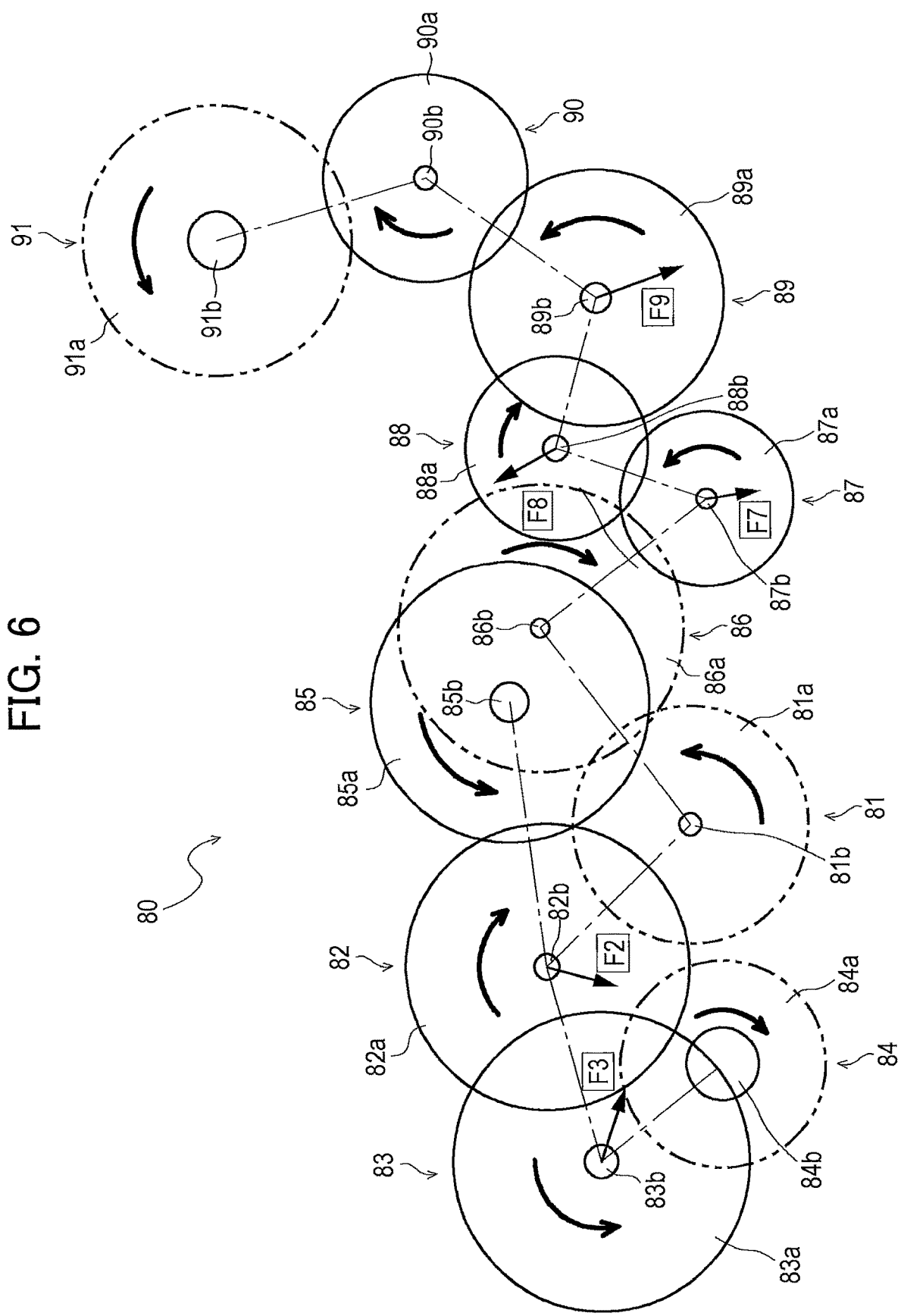
FIG. 6 is a schematic view illustrating the gear train of the gear mechanism according to the embodiment.
Figures 7A, 7B:
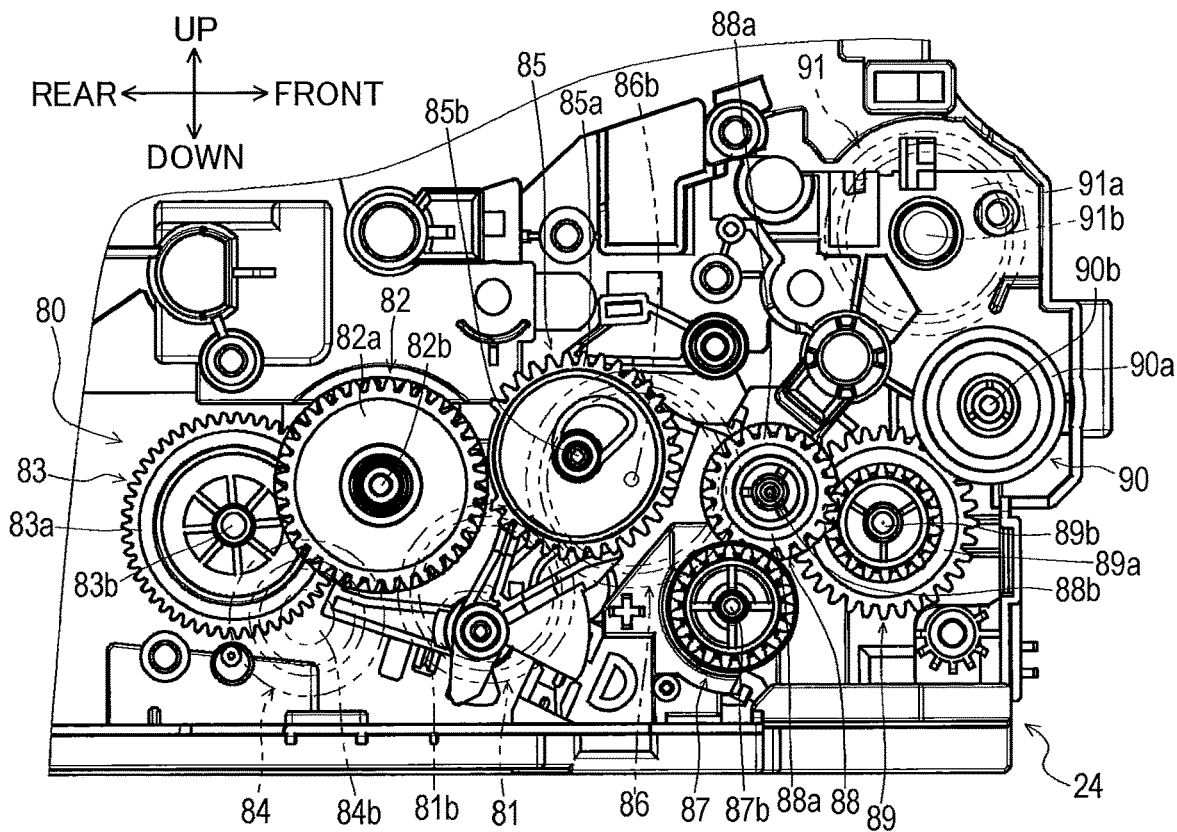
FIG. 7A is a schematic view illustrating layout of gears in the gear train of the gear mechanism according to the embodiment in which the gear cover is omitted.
FIG. 7B is a schematic view illustrating the gears in the gear train and the gear cover of the gear mechanism according to the embodiment.
Figure 9A:
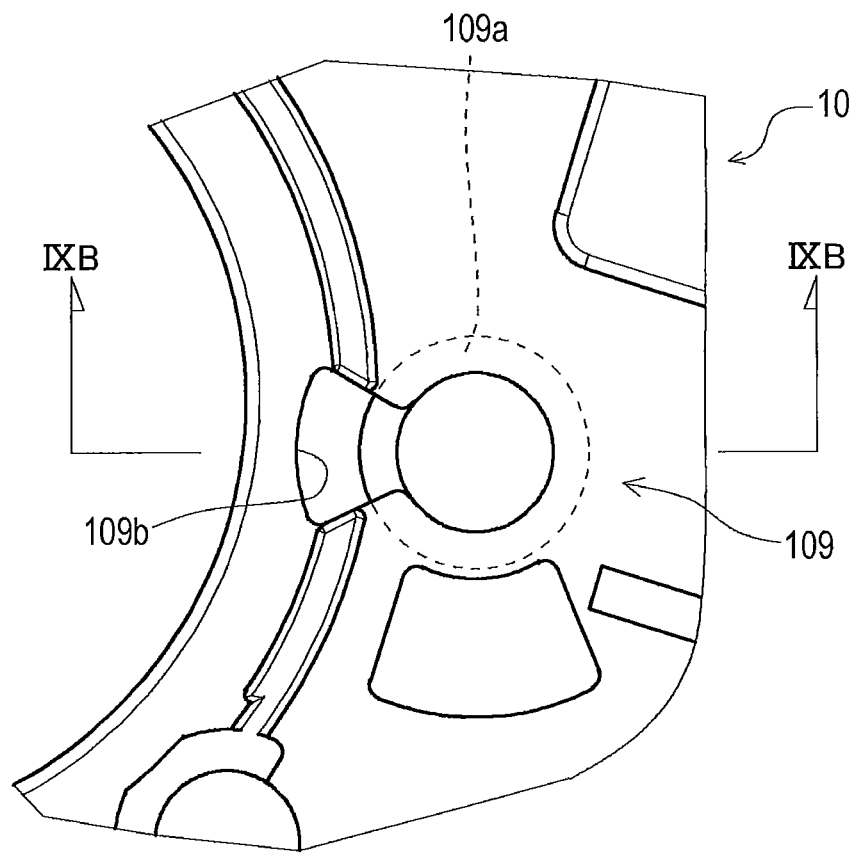
FIG. 9A is a partial enlarged view illustrating a detail of the notched portion and a collar portion of a bearing portion in the gear mechanism according to the embodiment.
Figure 9B:
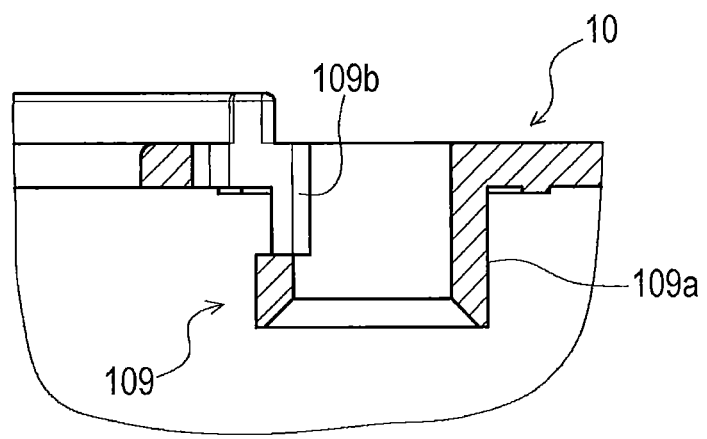
FIG. 9B is a cross-sectional view taken along a line IXB-IXB in FIG. 9A.
Figure 10A:
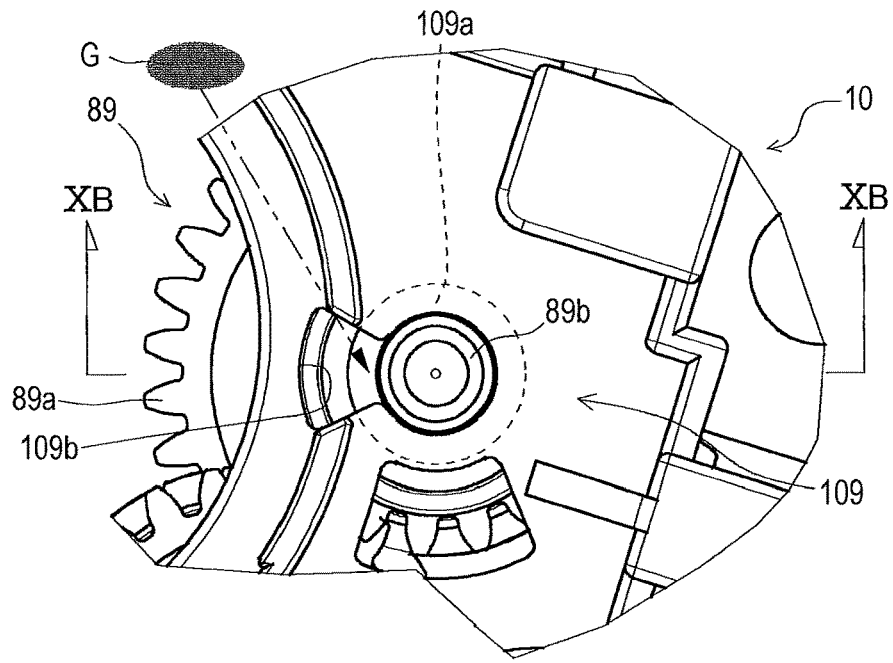
FIG. 10A is a partial enlarged view illustrating a position of the gear with respect to the notched portion in the gear mechanism according to the embodiment.
Figure 10B:
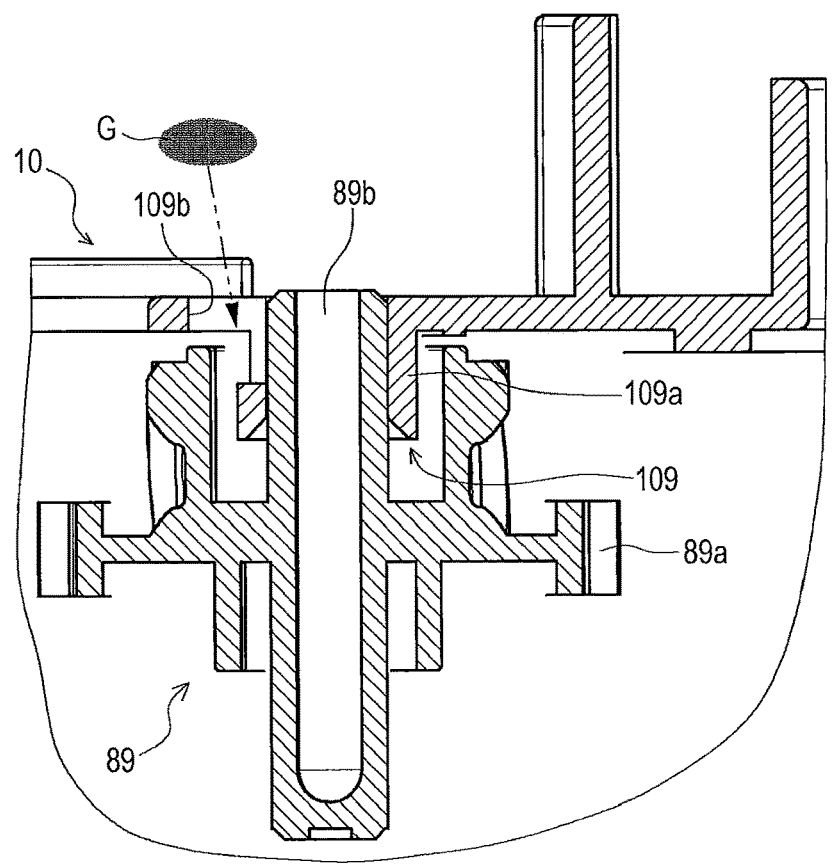
FIG. 10B is a cross-sectional view taken along a line XB-XB in FIG. 10A.

FIGS. 6 to 7B schematically illustrate arrangement of the gears constituting the gear train 80. The gear train 80 of the gear mechanism 8 includes eleven gears including a first gear 81, a second gear 82, a third gear 83, a fourth gear 84, a fifth gear 85, a sixth gear 86, a seventh gear 87, an eighth gear 88, a ninth gear 89, a tenth gear 90, and, an eleventh gear 91.

Figure 4:
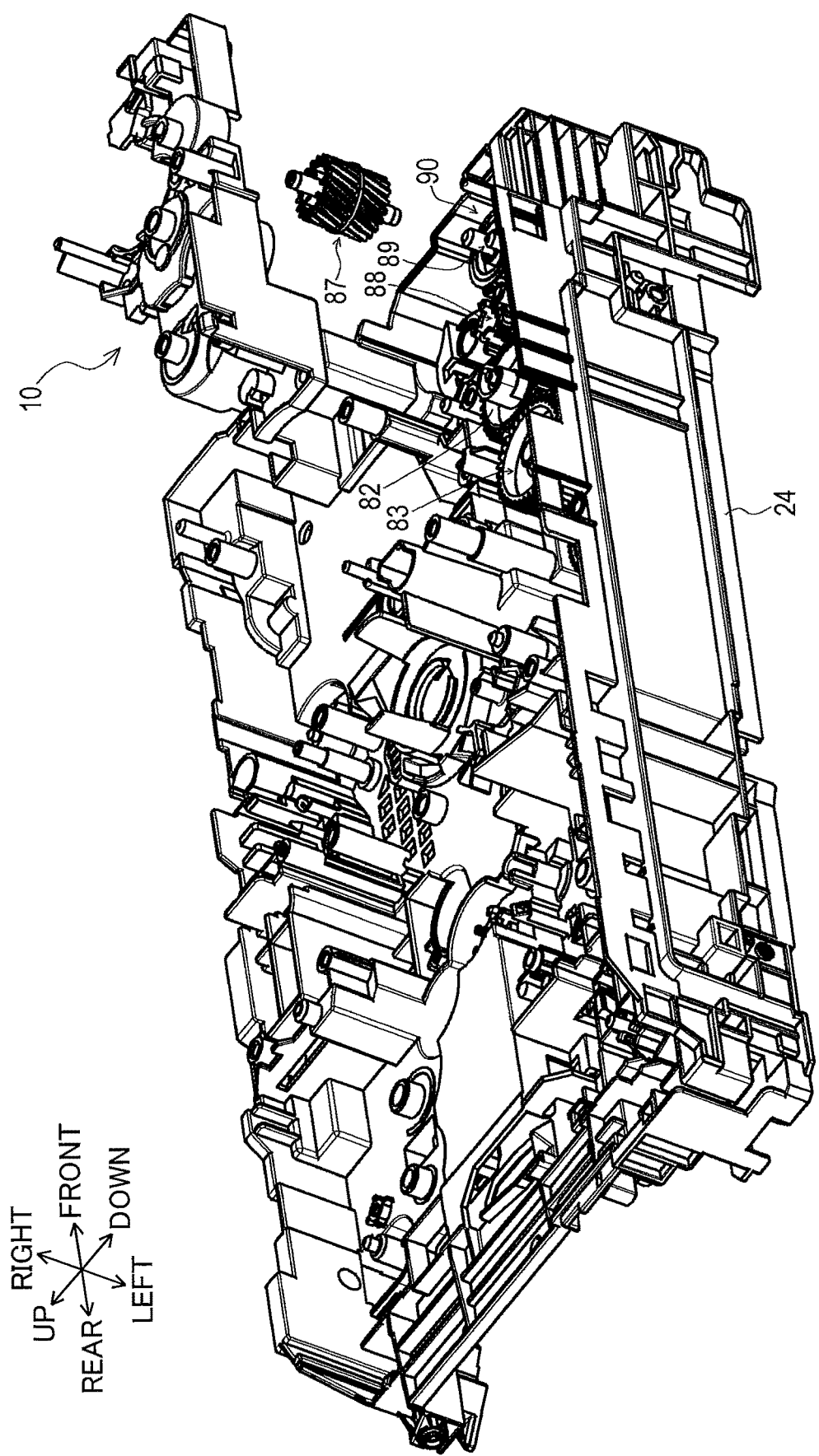
FIG. 4 is an exploded perspective view illustrating a right side frame of the image forming apparatus, and a gear train and a gear cover in a gear mechanism according to the embodiment.

Of the eleven gears constituting the gear train 80, the second gear 82, the third gear 83, the fifth gear 85, the seventh gear 87, the eighth gear 88, the ninth gear 89, and the tenth gear 90 are supported by the gear cover 10 at a position between the gear cover 10 and the right side frame 24, as illustrated in FIG. 4.

Incidentally, in FIGS. 6 and 7A, the gears 82, 83, 85, 87, 88, 89 and 90 positioned between the gear cover 10 and the right side frame 24 are delineated by a solid line, whereas the remaining gears 81, 84, 86 and 91 are delineated by two-dotted chain line. Further, in FIG. 7B, illustration of the gears 81, 84, 86, and 91 those are not supported by the gear cover 10 is omitted.

Figure 5A:
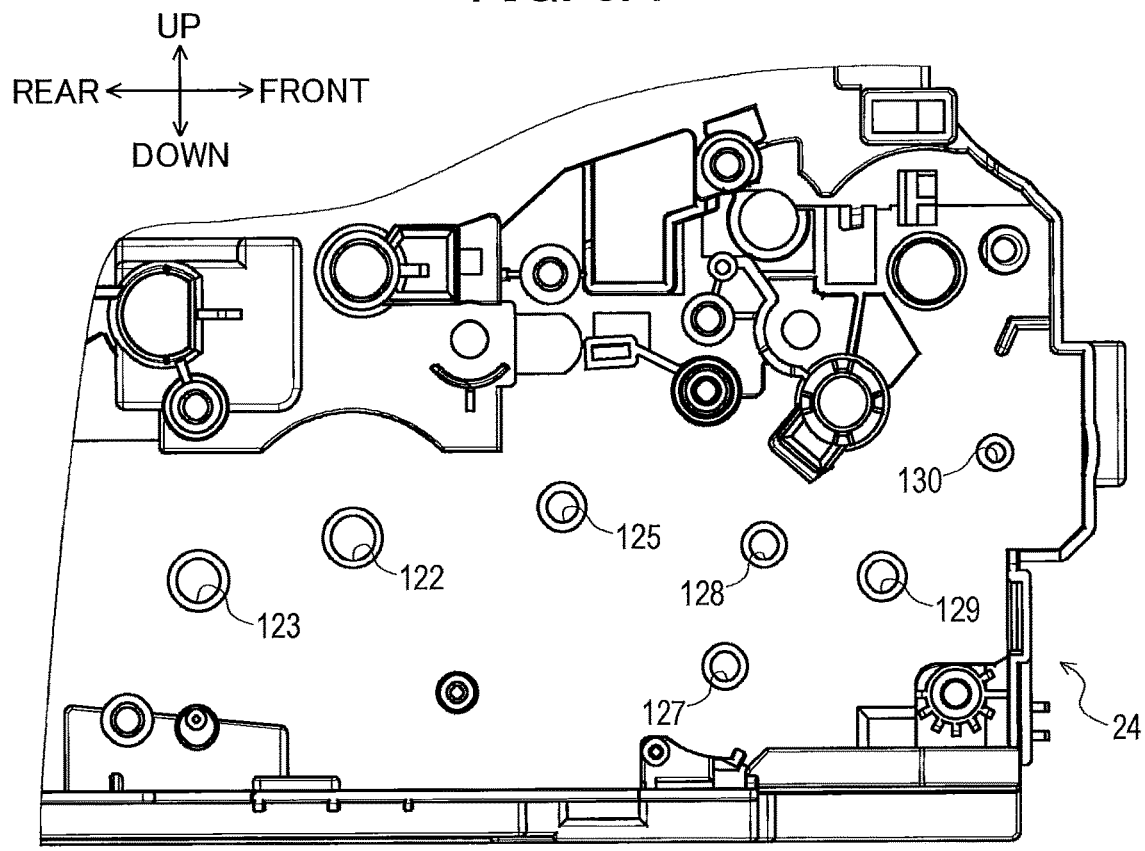
FIG. 5A is a partial schematic view illustrating the right side frame of the image forming apparatus according to the embodiment.
Figure 5B:
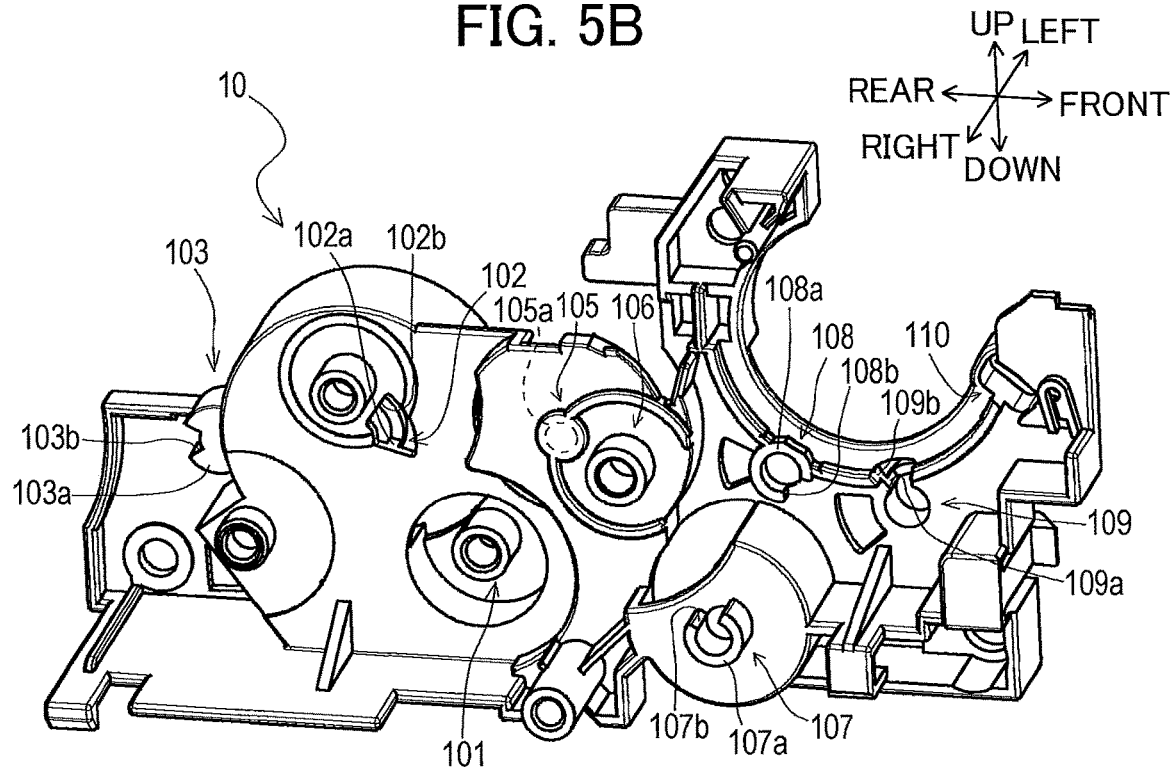
FIG. 5B is a perspective view illustrating the gear cover of the gear mechanism according to the embodiment.

As illustrated in FIG. 5A, the right side surface of the right side frame 24 is formed with a plurality of bearing portions 122, 123, 125, 127, 128, 129 and 130. Further, as illustrated in FIG. 5B, the gear cover 10 is formed with a plurality of bearing portions 101, 102, 103, 105, 106, 107, 108, 109 and 110.

As illustrated in FIGS. 6 and 7A, the first gear 81 includes a gear body 81a and a rotation shaft 81b. As illustrated in FIGS. 5B and 7B, the bearing portion 101 of the gear cover 10 is provided for supporting a left end portion of the rotation shaft 81b of the first gear 81. Further, an inner side surface (i.e., left side surface) of the right side plate 2c has a bearing portion 121 (see FIG. 3) for supporting a right end portion of the rotation shaft 81b.

In a state where the gear cover 10 and the right side plate 2c are assembled in prescribed positions, the bearing portion 101 and the bearing portion 121 are coaxial with each other in a left-right direction. The first gear 81 is rotatably supported by the bearing portion 101 and the bearing portion 121 at a position between the gear cover 10 and the right side plate 2c so that the rotation shaft 81b extends in parallel to the left-right direction.

As illustrated in FIGS. 6 and 7A, the second gear 82 includes a gear body 82a and a rotation shaft 82b. As illustrated in FIGS. 5B and 7B, the gear cover 10 has the bearing portion 102 for supporting a right end portion of the rotation shaft 82b of the second gear 82. The bearing portion 102 includes a collar portion 102a (see FIG. 8) having a generally hollow cylindrical shape, and a notched portion 102b. The collar portion 102a has a portion cut out (removed) to be notched, and the cut portion serves as the notched portion 102b. Further, as illustrated in FIG. 5A, the right side surface of the right side frame 24 is formed with the bearing portion 122 for supporting a left end portion of the rotation shaft 82b.

The bearing portion 102 and the bearing portion 122 are coaxial with each other in the left-right direction in a state where the gear cover 10 and the right side frame 24 are assemble in prescribed positions. The second gear 82 is rotatably supported by the bearing portion 102 and the bearing portion 122 at a position between the gear cover 10 and the right side frame 24 such that the rotation shaft 82b extends in the left-right direction.

As illustrated in FIGS. 6 and 7A, the third gear 83 includes a gear body 83a and a rotation shaft 83b. As illustrated in FIGS. 5B and 7B, the bearing portion 103 of the gear cover 10 is provided for supporting a right end portion of the rotation shaft 83b of the third gear 83. The bearing portion 103 includes a collar portion 103a having a generally hollow cylindrical shape, and a notched portion 103b formed by cut out a portion of the collar portion 103a. Further, as illustrated in FIG. 5A, the right side surface of the right side frame 24 has the bearing portion 123 for supporting a left end portion of the rotation shaft 83b.

The bearing portion 103 and the bearing portion 123 are coaxial with each other in the left-right direction in the state where the gear cover 10 and the right side frame 24 are assembled in the prescribed positions. The third gear 83 is rotatably supported by the bearing portion 103 and the bearing portion 123 at a position between the gear cover 10 and the right side frame 24 such that the rotation shaft 83b extends in the left-right direction.

As illustrated in FIGS. 6 and 7A, the fourth gear 84 includes a gear body 84a and a rotation shaft 84b. The fourth gear 84 is an output gear for transmitting rotation of the gear train 80 to the lifter plate 37. The fourth gear 84 is in meshing engagement with the third gear 83.

As illustrated in FIGS. 6 and 7A, the fifth gear 85 includes a gear body 85a and a rotation shaft 85b. A right end portion of the rotation shaft 85b of the fifth gear 85 is supported by the bearing portion 105 of the gear cover 10 illustrated in FIGS. 5B and 7B. The bearing portion 105 has a collar portion 105a having a substantially hollow cylindrical shape. Further, as illustrated in FIG. 5A, the right side surface of the right side frame 24 has the bearing portion 125 for supporting a left end portion of the rotation shaft 83b.

The bearing portion 105 and the bearing portion 125 are coaxial with each other in the left-right direction in the state where the gear cover 10 and the right side frame 24 are assembled in the prescribed positions. The fifth gear 85 is rotatably supported by the bearing portion 105 and the bearing portion 125 at a position between the gear cover 10 and the right side frame 24 such that the rotation shaft 85b extends in the left-right direction.

As illustrated in FIGS. 6 and 7A, the sixth gear 86 includes a gear body 86a and a shaft portion 86b. As illustrated in FIGS. 5B and 7B, the gear cover 10 has the bearing portion 106 for supporting a left end portion of the shaft portion 86b of the sixth gear 86. Further, the inner side surface of the right side plate 2c further has a bearing portion (not illustrated) for supporting a right end portion of the shaft portion 86b.

The bearing portion 106 and the bearing portion (not illustrated) of the right side plate 2c are coaxial with each other in the left-right direction in the state where the gear cover 10 and the right side plate 2c are assembled in the prescribed positions. The sixth gear 86 is rotatably supported by the bearing portion 106 and the bearing portion of the right side plate 2c at a position between the gear cover 10 and the right side plate 2c such that the shaft portion 86b extends in the left-right direction.

As illustrated in FIGS. 6 and 7A, the seventh gear 87 includes a gear body 87a and a rotation shaft 87b. The rotation shaft 87b of the seventh gear 87 has a right end portion supported by the bearing portion 107 illustrated in FIGS. 5B and 7B. The bearing portion 107 includes a collar portion 107a having a substantially hollow cylindrical shape, and a notched portion 107b formed by cutting out a portion of the collar portion 107a. Further, as illustrated in FIG. 5A, the right side surface of the right side frame 24 has the bearing portion 127 for supporting a left end portion of the rotation shaft 87b.

The bearing portion 107 and the bearing portion 127 are coaxial with each other in the left-right direction in the state where the gear cover 10 and the right side frame 24 are assembled in the prescribed positions. The seventh gear 87 is rotatably supported by the bearing portion 107 and the bearing portion 127 at a position between the gear cover 10 and the right side frame 24 such that the rotation shaft 87b extends in the left-right direction.

As illustrated in FIGS. 6 and 7A, the eighth gear 88 includes a gear body 88a and a rotation shaft 88b. As illustrated in FIGS. 5B and 7B, the gear cover 10 has the bearing portion 108 for supporting a right end portion of the rotation shaft 88b of the eighth gear 88. The bearing portion 108 includes a collar portion 108a having a generally hollow cylindrical shape, and a notched portion 108b. The collar portion 108a has a portion cut out to form the notched portion 108b. Further, a left end portion of the rotation shaft 88b is supported by the bearing portion 128 of the right side surface of the right side frame 24 illustrated in FIG. 5A.

The bearing portion 108 and the bearing portion 128 are coaxial with each other in the left-right direction in the state where the gear cover 10 and the right side frame 24 are assembled in the prescribed positions. The eighth gear 88 is rotatably supported by the bearing portion 108 and the bearing portion 128 at a position between the gear cover 10 and the right side frame 24 such that the rotation shaft 88b extends in the left-right direction.

As illustrated in FIGS. 6 and 7A, the ninth gear 89 includes a gear body 89a and a rotation shaft 89b. The rotation shaft 89b of the ninth gear 89 has a right end portion supported by the bearing portion 109 of the gear cover 10 illustrated in FIGS. 5B and 7B. The bearing portion 109 includes a collar portion 109a having a generally hollow cylindrical shape, and a notched portion 109b formed by cutting out a portion of the collar portion 109a. Further, the rotation shaft 89b has a left end portion supported by the bearing portion 129 of the right side surface of the right side frame 24 illustrated in FIG. 5.

The bearing portion 109 and the bearing portion 129 are coaxial with each other in the left-right direction in the state where the gear cover 10 and the right side frame 24 are assembled in the prescribed positions. The ninth gear 89 is rotatably supported by the bearing portion 109 and the bearing portion 129 at a position between the gear cover 10 and the right side frame 24 such that the rotation shaft 89b extends in the left-right direction.

As illustrated in FIGS. 6 and 7A, the tenth gear 90 includes a gear body 90a and a rotation shaft 90b. The rotation shaft 90b of the tenth gear 90 has a right end portion supported by the bearing portion 110 of the gear cover (see FIGS. 5B and 7B), and a left end portion supported by the bearing portion 130 of the right side surface of the right side frame 24 (see FIG. 5A).

The bearing portion 110 and the bearing portion 130 are coaxial with each other in the left-right direction in the state where the gear cover 10 and the right side frame 24 are assembled in the prescribed positions. The tenth gear 90 is rotatably supported by the bearing portion 110 and the bearing portion 130 at a position between the gear cover 10 and the right side frame 24 such that the rotation shaft 90b extends in the left-right direction.

As illustrated in FIGS. 6 and 7A, the eleventh gear 91 includes a gear body 91a and a rotation shaft 91b. The eleventh gear 91 is an output gear for transmitting rotation of the gear train 80 to the conveying roller 38. The fourth gear 84 is in meshing engagement with the tenth gear 90.

In the gear train 80 described above, the first gear 81 and the sixth gear 86 are rotatably supported at the position between the right side plate 2c and the gear cover 10, while the second gear 82, the third gear 83, the fifth gear 85, the seventh gear 87, the eighth gear 88, the ninth gear 89, and the tenth gear 90 are rotatably supported at the position between the gear cover 10 and the right side frame 24.

Further, in the gear cover 10 supporting the gear train 80, the bearing portion 102, the bearing portion 103, the bearing portion 107, the bearing portion 108, and the bearing portion 109 are formed with the notched portion 102b, the notched portion 103b, the notched portion 107b, the notched portion 108b, and the notched portion 109b, respectively.

<Process of Assembling Gear Mechanism>

A process of assembling the gear mechanism 8 will next be described. Firstly, grease is applied in advance to each of the bearing portions 122, 123, 125, 127, 128, 129 and 130 of the right side frame 24 (see FIG. 5A).

Then, each of the second gear 82, the third gear 83, the fifth gear 85, the seventh gear 87, the eighth gear 88, the ninth gear 89 and the tenth gear 90 is placed on the corresponding one of bearing portions 122, 123, 125, 127, 128, 129 and 130 of the right side frame 24.

Specifically, the left end portion of the rotation shaft 82b of the second gear 82 is inserted into the bearing portion 122; the left end portion of the rotation shaft 83b of the third gear 83 is inserted into the bearing portion 123; the left end portion of the rotation shaft 85b of the fifth gear 85 is inserted into the bearing portion 125; the left end portion of the rotation shaft 87b of the seventh gear 87 is inserted into the bearing portion 127; the left end portion of the rotation shaft 88b of the eighth gear 88 is inserted into the bearing portion 128; the left end portion of the rotation shaft 89b of the ninth gear 89 is inserted into the bearing portion 129; and the left end portion of the rotation shaft 90b of the tenth gear 90 is inserted into the bearing portion 130.

Next, the gear cover 10 is assembled to the right side frame 24. During this assembly, the right end portion of the rotation shaft 82b of the second gear 82 is inserted into the collar portion 102a of the bearing portion 102; the right end portion of the rotation shaft 83b of the third gear 83 is inserted into the collar portion 103a of the bearing portion 103; the right end portion of the rotation shaft 85b of the fifth gear 85 is inserted into the collar portion 105a of the bearing portion 105; the right end portion of the rotation shaft 87b of the seventh gear 87 is inserted into the collar portion 107a of the bearing portion 107; the right end portion of the rotation shaft 88b of the eighth gear 88 is inserted into the collar portion 108a of the bearing portion 108; the right end portion of the rotation shaft 89b of the ninth gear 89 is inserted into the collar portion 109a of the bearing portion 109; and the right end portion of the rotation shaft 90b of the tenth gear 90 is inserted into the bearing portion 110.

Next, grease is applied to each of the notched portions of the bearing portions 102, 103, 107, 108 and 109. Specifically, grease is applied to each of the notched portion 102b formed in the collar portion 102a; the notched portion 103b formed in the collar portion 103a; the notched portion 107b formed in the collar portion 107a; the notched portion 108b formed in the collar portion 108a; and the notched portion 109b formed in the collar portion 109a.

Hence, grease can be supplied to each of the right end portion of the rotation shaft 82b of the second gear 82, the right end portion of the rotation shaft 83b of the third gear 83, the right end portion of the rotation shaft 87b of the seventh gear 87, the right end portion of the rotation shaft 88b of the eighth gear 88, and the right end portion of the rotation shaft 89b of the ninth gear 89.

Here, grease may be applied to the bearing portions 102, 103, 107, 108 and 109 simultaneously using a jig configured to hold a plurality of applicators.

Next, grease is applied to each of the bearing portions 101 and 106 formed on a right side surface of the gear cover 10. Note that the application of grease to the bearing portions 101 and 106 may be performed concurrently with the application of grease to the bearing portions 102, 103, 107, 108 and 109.

Next, each of the first gear 81 and the sixth gear 86 is coupled to corresponding one of bearing portions 101 and 106. Specifically, the left end portion of the rotation shaft 81b of the first gear 81 is inserted into the bearing portion 101; and the left end portion of the shaft portion 86b of the sixth gear 86 is inserted into the bearing portion 106.

Next, the right side plate 2c is assembled to constitute the housing 2. In this assembly, the right end portion of the rotation shaft 81b of the first gear 81 is inserted into the bearing portion 121 of the right side plate 2c, and the right end portion of the shaft portion 86b of the sixth gear 86 is inserted into the bearing portion (not illustrated) of the right side plate 2c. Prior to the insertions, grease is applied to the bearing portion 121 and the bearing portion (not illustrated).

The gear mechanism 8 is assembled in accordance with the above-described process. In the gear mechanism 8, the notched portions 102b, 103b, 107b, 108b and 109b are formed at the five bearing portions 102, 103, 107, 108 and 109, respectively, and the grease can be supplied to each of the right end portions of the rotation shafts after assembling the gear cover 10 to the right side frame 24. That is, the gear mechanism 8 provides a structure capable of applying grease to the gears after coupling the gears.

Further, in the gear mechanism 8, each of the right end portions of the rotation shafts of the gears 82, 83, 85, 87, 88, 89 and 90 protrudes outward of the right side frame 24 toward the right side plate 2c, and each of the bearing portions 102, 103, 105, 107, 108, 109 and 110 supports the protruding ends (right end portions) of the corresponding one of the rotation shafts 82b, 83b, 85b, 87b, 88b, 89b and 90b.

<Meshing Engagement Force applied to Each Gear>

Hereinafter, a meshing engagement force imparted on each gear in the gear mechanism 8 will be described. Here, "meshing engagement force" denotes a force applied to each gear from another gear in meshing engagement with the gear when the gear is rotated. During the rotation, each of the gears in the gear mechanism 8 is pressed due to the meshing engagement force applied by the meshing gears.

As illustrated in FIG. 6, when the first gear 81 as an input gear is rotated in the counterclockwise direction in accordance with the rotation of the motor 7, the second gear 82 is rotated in the clockwise direction, the third gear 83 is rotated in the counterclockwise direction, and the fourth gear 84 as an output gear is rotated in the clockwise direction.

Here, since the second gear 82 is in meshing engagement with both the first gear 81 and the third gear 83, a resultant force F2 is applied to the second gear 82. The resultant force F2 is a resultant force of the meshing engagement force applied from the first gear 81 and the meshing engagement force applied from the third gear 83. Lines of action of the meshing engagement forces pass through a center of the rotation shaft 82b of the second gear 82. A direction of action of the resultant force F2 is indicted by an arrow in FIGS. 6 and 8. That is, during operation of the gear mechanism 8, the rotation shaft 82b of the second gear 82 is constantly urged toward the bearing portion 102 in the direction of action of the resultant force F2.

Further, the third gear 83 is in meshing engagement with both the second gear 82 and the fourth gear 84. Accordingly, a resultant force F3 acts on the third gear 83. The resultant force F3 is a resultant force of the meshing engagement force applied from the second gear 82 and the meshing engagement force applied from the fourth gear 84. FIGS. 6 and 8 depicts a direction of action of the resultant force F3 by an arrow. That is, during operation of the gear mechanism 8, the rotation shaft 83b of the third gear 83 is constantly urged with respect to the bearing portion 103 in the direction of action of the resultant force F3.

Here, a line L2 perpendicular to the direction of action of the resultant force F2 and passing through the center of the rotation shaft 82b is illustrated in FIGS. 6 and 8. Assuming that an imaginary plane containing the line L2 and extending in the left-right direction is defined, the collar portion 102a is divided by the imaginary plane into a first region positioned further in the direction of action of the resultant force F2 than the line L2, and a second region opposite the first region.

The notched portion 102b is formed in the second region of the collar portion 102a of the bearing portion 102. Here, the first region of the collar portion 102a is a portion pressed by the right end portion of the rotation shaft 82b of the second gear 82 due to the resultant force F2. On the other hand, the second region of the collar portion 102a is a portion not pressed by the rotation shaft 82b of the second gear 82, and hence, a gap is likely to be formed between an inner peripheral surface of the second region of the collar portion 102a and an outer peripheral surface of the rotation shaft 82b.

Similarly, a line L3 perpendicular to the direction of action of the resultant force F3 and passing through the center of the rotation shaft 83b is illustrated in FIGS. 6 and 8. Assuming that an imaginary plane containing the line L3 and extending in the left-right direction is defined, the collar portion 103a is divided by the imaginary plane into a first region positioned further in the direction of action of the resultant force F3 than the line L3, and a second region opposite the first region.

Here, the notched portion 103b is formed in the second region of the collar portion 103a. The first region of the collar portion 103a is a portion pressed by the rotation shaft 83b of the third gear 83 due to the resultant force F3, the second region of the collar portion 103a is a portion not pressed by the rotation shaft 83b of the third gear 83 Accordingly, a gap is likely to be formed between an inner peripheral surface of the second region of the collar portion 103a and an outer peripheral surface of the rotation shaft 83b.

As illustrated in FIG. 6, upon rotation of the first gear 81 as the input gear in the counterclockwise direction by the transmission of rotation from the motor 7, the sixth gear 86 is rotated in the clockwise direction, the seventh gear 87 is rotated in the counterclockwise direction, the eighth gear 88 is rotated in the clockwise direction, the ninth gear 89 is rotated in the counterclockwise direction, the tenth gear 90 is rotated in the clockwise direction, and the eleventh gear 91 as an output gear is rotated in the counterclockwise direction.

As illustrated in FIG. 8, the seventh gear 87 is in meshing engagement with both the sixth gear 86 and the eighth gear 88, and hence a resultant force F7 acts on the seventh gear 87. The resultant force F7 is a resultant force of the meshing engagement force applied from the sixth gear 86 and the meshing engagement force applied from the eighth gear 88. A direction of action of the resultant force F7 is indicted by an arrow in FIGS. 6 and 8. That is, during operation of the gear mechanism 8, the rotation shaft 87b of the seventh gear 87 is constantly urged toward the bearing portion 107 in the direction of action of the resultant force F7.

Further, since the eighth gear 88 is in meshing engagement with both the seventh gear 87 and the ninth gear 89, a resultant force F8 is applied to the eighth gear 88. The resultant force F8 is a resultant force of the meshing engagement force applied from the seventh gear 87 and the meshing engagement force applied from the ninth gear 89. A direction of action of the resultant force F8 is indicted by an arrow in FIGS. 6 and 8. That is, during operation of the gear mechanism 8, the rotation shaft 88b of the eighth gear 88 is constantly urged in the direction of action of the resultant force F8 toward the bearing portion 108.

Further, the ninth gear 89 is in engagement with both the eighth gear 88 and the tenth gear 90. Thus, a resultant force F9 acts on the ninth gear 89. The resultant force F9 is a resultant force of the meshing engagement force applied from the eighth gear 88 and the meshing engagement force applied from the tenth gear 90. A direction of action of the resultant force F9 is indicted by an arrow in FIGS. 6 and 8. That is, during operation of the gear mechanism 8, the rotation shaft 89b of the ninth gear 89 is constantly urged in the direction of action of the resultant force F9 toward the bearing portion 109.

As illustrated in FIG. 8, a line L7 perpendicular to the direction of action of the resultant force F7 and passing through the center of the rotation shaft 87b is defined. Assuming that an imaginary plane containing the line L7 and extending in the left-right direction is also defined, the collar portion 107a is divided by the imaginary plane into a first region positioned further in the direction of action of the resultant force F7 than the line L7, and a second region opposite the first region.

The notched portion 107b is formed in the second region of the collar portion 107a of the bearing portion 107. Here, the first region of the collar portion 107a is a portion pressed by the right end portion of the rotation shaft 87b of the seventh gear 87 due to the resultant force F7. On the other hand, the second region of the collar portion 107a is a portion that is not pressed by the rotation shaft 87b of the seventh gear 87. As a result, a gap is likely to be formed between an inner peripheral surface of the second region of the collar portion 107a and an outer peripheral surface of the rotation shaft 87b.

Further, a line L8 perpendicular to the direction of action of the resultant force F8 and passing through the center of the rotation shaft 88b is illustrated in FIG. 8. Assuming that an imaginary plane containing the line L8 and extending in the left-right direction is defined, the collar portion 108a of the bearing portion 108 is divided by the imaginary line into a first region positioned further in the direction of action of the resultant force F8 than the line L8, and a second region opposite the first region.

The notched portion 108b is formed in the second region in the collar portion 108a of the bearing portion 108. The first region of the collar portion 108a is a portion pressed by the right end portion of the rotation shaft 88b of the eighth gear 88 due to the resultant force F8, whereas the second region of the collar portion 108a is a portion not pressed by the right end portion of the rotation shaft 88b of the eighth gear 88. Hence, a gap is likely to be formed between an inner peripheral surface of the second region of the collar portion 108a and an outer peripheral surface of the rotation shaft 88b.

Further, FIGS. 6 and 8 illustrates a line L9 perpendicular to the direction of action of the resultant force F9 and passing through the center of the rotation shaft 89b. Assuming that an imaginary plane containing the line L9 and extending in the left-right direction is defined, the collar portion 109a of the bearing portion 109 is divided by the imaginary line into a first region positioned further in the direction of action of the resultant force F9 than the line L9, and a second region opposite the first region.

The notched portion 109b is formed in the second region of the collar portion 109a of the bearing portion 109. The first region of the collar portion 109a is a portion pressed by the right end portion of the rotation shaft 89b of the ninth gear 89 due to the resultant force F9. On the other hand, the second region of the collar portion 109a is a portion not pressed by the rotation shaft 89b of the ninth gear 89. Therefore, a gap (a gap D illustrated in FIG. 11) is likely to be formed between an inner peripheral surface of the second region of the collar portion 109a and an outer peripheral surface of the rotation shaft 89b.

As described above, each of the lines L2, L3, L7, L8 and L9 extends in the direction perpendicular to the direction of action of the corresponding one of resultant forces F2, F3, F7, F8 and F9, and each of the lines L2, L3, L7, L8 and L9 passes through the center of the corresponding rotation shaft 82b, rotation shaft 83b, rotation shaft 87b, rotation shaft 88b and rotation shaft 89b. Each of the lines will be referred to as a first linear line.

The first linear line divides the collar portion (102a, 103a, 107a, 108a and 109a) of the bearing portion (102, 103, 107, 108 and 109) into the first region positioned further in the direction of action of the resultant force, and the second region opposite the first region. Each of the notched portions 102b, 103b, 107b, 108b and 109b is formed in the second region of the corresponding collar portion 102a, 103a, 107a, 108a and 109a.

That is, in the gear mechanism 8, each of the notched portions is formed in a specific portion of the corresponding bearing portion on which any meshing engagement force is not imparted. In the specific portion of the bearing portion, the gap is likely to be formed between the rotation shaft of the gear and the collar portion of the bearing portion. Hence, grease can be efficiently applied to the gap through the notched portion.

Further, as illustrated in FIG. 8, each of the notched portions 103b, 107b, 108b and 109b is positioned on the line of action of the corresponding one of resultant forces F3, F7, F8 and F9 in the second region. In other words, each notched portion is formed in the position to which the resultant force is the most unlikely to be applied. Consequently, breakage of the bearing portion due to the formation of the notched portion is unlikely to occur.

Further, as illustrated in FIG. 8, each of the notched portions 102b, 103b, 107b, 108b and 109b has a sector shape. That is, each of the notched portions 102b, 103, 107b, 108b and 109b has a gap length in a circumferential direction of the corresponding collar portions 102a, 103a, 107a, 108a and 109a, and the gap length increases as going radially outward. By virtue of this sector shape of each notched portion, application of grease into the notched portion from an outside can be facilitated.

<Notched Portions of Bearing Portions>

The further detailed appearance of the notched portions will be described with reference to FIGS. 9A through 10B. Here, the relationship between the ninth gear 89 and the bearing portion 109 associated therewith will be described as a typical example. Note that the Remaining bearing portions 102, 103, 107 and 108 with which the notched portions are formed have structures the same as the bearing portion 109.

As illustrated in FIGS. 9A through 10B, a portion of the collar portion 109a is cut out to form the notched portion 109b. The collar portion 109a has a substantially hollow cylindrical portion adjacent to the gear body 89a of the ninth gear 89 so as to hold the rotation shaft 89b with an entire circumference of the substantially hollow cylindrical portion. Of the collar portion 109a, the notched portion 109b is formed in a portion (an example of a first portion) positioned farther away from the gear body 89a in the left-right direction.

With this configuration, the hollow cylindrical portion of the collar portion 109a positioned adjacent to the gear body 89a (an example of a second portion) can stably rotatably support the rotation shaft 89b, and the other portion of the collar portion 109a away from the gear body 89a allows grease to be easily applied to the rotation shaft 89b through the notched portion 109b. Accordingly, even if a draft is formed in the rotation shaft 89*b* and/or the collar portion 109*a*, the collar portion 109*a* can stably hold the rotation shaft 89*b* while realizing facilitation of application of grease to the notched portion 109*b*.

<Grease Retaining Portion of Notched Portion>

A grease retaining portion formed in the bearing portion will be described with reference to FIG. 11. Here, a configuration in which a grease retaining portion 109*c* is formed in the bearing portion 109 is exemplified. However, the remaining bearing portions 102, 103, 107 and 108 may have configurations identical to the bearing portion 109.

Figure 11:
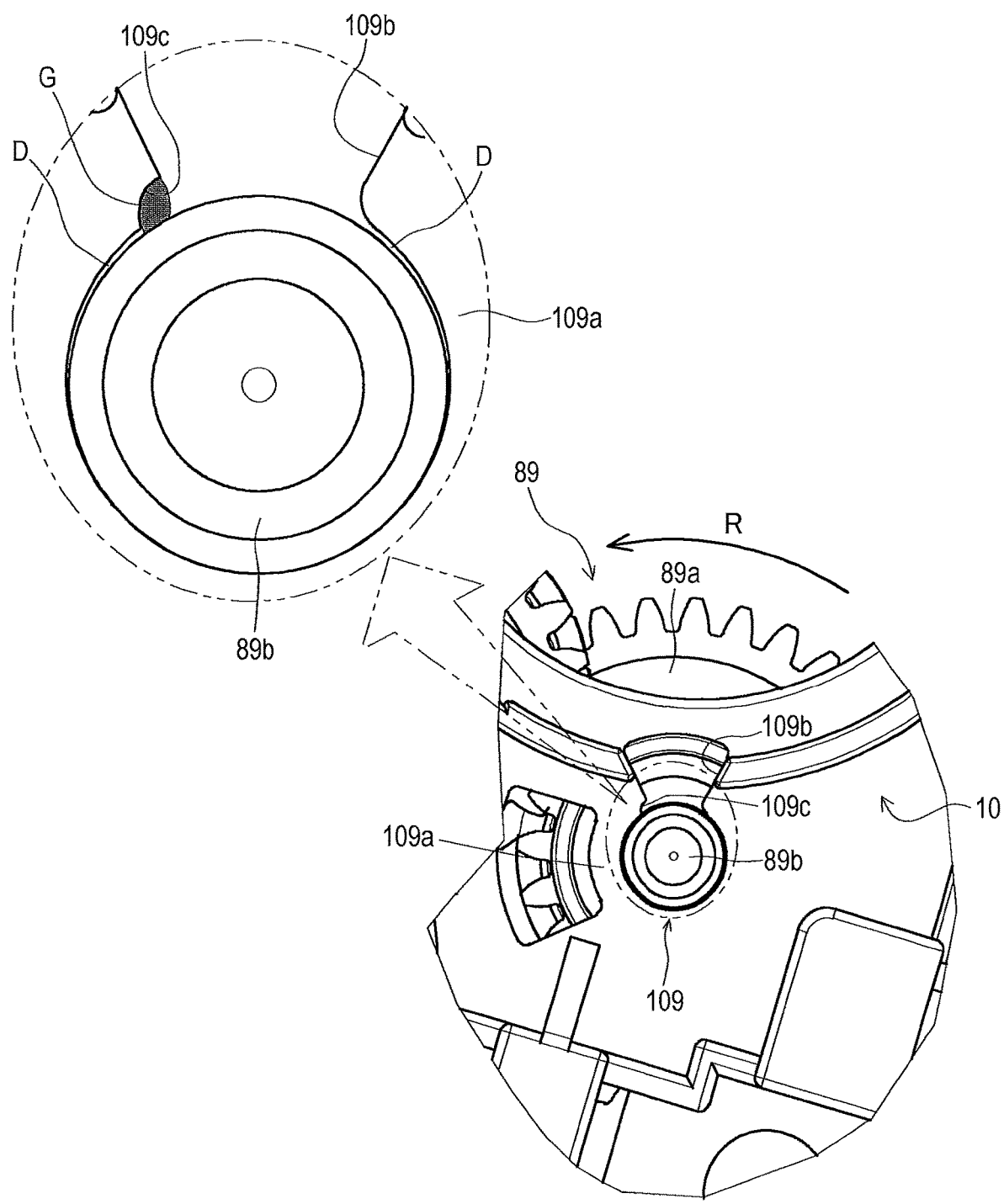
FIG. 11 is a partial enlarged view illustrating the bearing portion formed with a grease retaining portion in the gear mechanism according to the embodiment.

The bearing portion 109 is formed with the grease retaining portion 109*c* as illustrated in FIG. 11. The grease retaining portion 109*c* is in a form of a recessed shape so as to retain therein grease G applied to the notched portion 109*b*. The grease retaining portion 109*c* is formed in a boundary between the collar portion 109*a* and the notched portion 109*b* so as to be continuous with the notched portion 109*b*. Of two boundaries between the collar portion 109*a* and the notched portion 109*b*, the boundary (an example of a first boundary) in which the grease retaining portion 109*c* is formed is positioned upstream of the remaining one boundary (an example of a second boundary) in a rotational direction R of the rotation shaft 89*b* inserted through the collar portion 109*a*.

With this configuration, the grease G applied to the notched portion 109*b* is retained at a position upstream of rotation shaft 89*b* inserted through the collar portion 109*a* in the rotational direction of the rotation shaft 89*b*. Accordingly, the grease G can be appropriately supplied from the grease retaining portion 109*c* to a portion between the rotation shaft 89*b* and the collar portion 109*a*. Hence, the grease G can be retained in the portion between the collar portion 109*a* and the rotation shaft 89*b* for a long period of time.

<Advantageous Effects in the Embodiment>

As described above, the image forming apparatus 1 including the gear mechanism 8 is configured as described above. In summary, the gear mechanism 8 provided in the image forming apparatus 1 includes, for example, the ninth gear 89 including the gear body 89*a* and the rotation shaft 89*b*. The ninth gear 89 is meshingly engageable with the other gears (i.e., the eighth gear 88 and the tenth gear 90). Further, the gear mechanism 8 includes the bearing portion 109 associated with the ninth gear 89. The bearing portion 109 includes the collar portion 109*a* allowing the rotation shaft 89*b* to be inserted therethrough to rotatably support the rotation shaft 89*b*. Further, the bearing portion 109 has the notched portion 109*b*. A portion of the collar portion 109*a* is cut out to form the notched portion 109*b*. The rotation shaft 90*b* inserted through the collar portion 109*a* has at least a portion exposed to an outside of the collar portion 109*a* through the notched portion 109*b*.

The line L9 (the first linear line) extending perpendicularly to the direction of action of the force (the resultant force F9) applied to the ninth gear 89 from both the eighth gear 88 and the tenth gear 90, and passing through the center of the rotation shaft 89*b* is defined. Further, by the imaginary plane containing the line L9 and extending in the left-right direction, the collar portion 109*a* is divided into the first region positioned further in the direction of action of the resultant force F9 than the line L9, and the second region opposite the first region. The notched portion 109*b* is formed within the second region.

With the gear mechanism 8 configured as described above, by virtue of the notched portion 109*b*, grease can be applied to the bearing portion 109 and the rotation shaft 89*b* after assembling the ninth gear 89 into the gear mechanism 8. The bearing portion 109 has a portion that functions to receive the meshing engagement force (the resultant force F9) that is applied to the ninth gear 89, and hence, the notched portion 109 should not be positioned at a portion of the bearing portion 109 receiving the meshing engagement force.

Meanwhile, the bearing portion 109 has another portion not functioning to receive the meshing engagement force applied to the ninth gear 89, and the gap D (see FIG. 11) is likely to be formed between the rotation shaft 89*b* and the bearing portion 109 in the vicinity of the other portion of the bearing portion 109. Owing to this gap D, the grease G can be efficiently applied to a portion between the bearing portion 109 and the rotation shaft 89*b* of the ninth gear 89.

Further, the gear mechanism 8 includes the plurality of gears 81 to 91, and the plurality of bearing portions 101, 102, 103, 105, 106, 107, 108, 109 and 110 provided in the gear cover 10 and the plurality of bearing portions 121, 122, 123, 125, 127, 128, 129 and 130 provided in the right side frame 24. With such a configuration of the gear mechanism 8, manufacturing process can be reduced by virtue of the notched portions 102*b*, 103*b*, 107*b*, 108*b* and 109*b*, because grease can be applied to these notched portions 102*b*, 103*b*, 107*b*, 108*b* and 109*b* after the gears are assembled into the gear mechanism 8.

Further, each of the notched portions 102*b*, 103, 107*b*, 108*b* and 109*b* has a gap length in the circumferential direction that increases as going radially outward. This shape enables application of grease into the notched portion from an outside to be facilitated.

Further, in the gear mechanism 8, the bearing portion 109 is formed with the grease retaining portion 109*c*. The grease retaining portion 109*c* is formed at the boundary between the collar portion 109*a* and the notched portion 109*b*, and the boundary is positioned upstream of the remaining one boundary between the collar portion 109*a* and the notched portion 109*b* in the rotational direction R of the rotation shaft 89*b* inserted through the collar portion 109*a*.

With this configuration, since the grease G applied to the notched portion 109*b* can be retained at the upstream end portion of collar portion 109*a* in the rotational direction R, the grease G can be supplied appropriately from the grease retaining portion 109*c* to a portion between the rotation shaft 89*b* and the collar portion 109*a*. Hence, the grease G can be retained in the portion between the collar portion 109*a* and the rotation shaft 89*b* for a long period of time.

Further, in the gear mechanism 8, each of the notched portions 103*b*, 107*b*, 108*b* and 109*b* are formed on the corresponding one of lines of action of the resultant forces F3, F7, F8 and F9. Therefore, each notched portion is formed at position to which the corresponding resultant force is most unlikely to be applied. This configuration can reduce breakage of the bearing portion resulted from the formation of the notched portion.

Further, in the gear mechanism 8, the notched portion 109*b* is formed in the bearing portion 109 at a position farther away from the gear body 89*a* in the axial direction of the rotation shaft 89*b* (i.e., the left-right direction). Further, the bearing portion 109 has a substantially hollow cylindrical portion positioned closer to the gear body 89*a* in the axial direction than the notched portion 109*b* is to the gear body 89*a* so as to surround the entire circumference of the rotation shaft 89*b*.

The substantially hollow cylindrical portion of the collar portion 109*a* can therefore stably rotatably support the rotation shaft 89*b*, and at the same time, the other portion of the collar portion 109*a* can allow grease to be easily applied to the collar portion 109*a* through the notched portion 109*b*. Accordingly, stable support of the rotation shaft 89*b* and facilitation of application of the grease G can be realized simultaneously even if a draft is formed in the rotation shaft 89*b* and/or the collar portion 109*a*.

Further, the image forming apparatus 1 according to the present embodiment includes the image forming unit 4, the right side frame 24 supporting the image forming unit 4, and the gear mechanism 8 provided on the right side frame 24. In the image forming apparatus 1, grease G can be easily applied to the bearing portions even after assembling the gears.

Further, in the image forming apparatus 1, the rotation shaft 89*b* protrudes outward (rightward) of the right side frame 24 to have a protruding end portion, and the bearing portions 109 provided in the gear cover 10 supports the protruding end portion (i.e., the right end portion) of the rotation shaft 89*b*. Since the bearing portion 109 provided in the gear cover 10 is positioned outward of the right side frame 24 in the image forming apparatus 1, the grease G can be easily applied to the ninth gear 89 from the outside of the gear cover 10 even the ninth gear 89 is assembled into the gear mechanism 8.

While the description has been made in detail with reference to specific embodiment, it would be apparent to those skilled in the art that various changes and modifications may be made thereto without departing from the scope of the present disclosure.

What is claimed is:

1. A gear mechanism comprising:
   at least one gear comprising a gear body and a rotation shaft extending in an axial direction, the at least one gear being capable of meshing engagement with another gear, a force being applied to the at least one gear from the another gear due to the meshing engagement with the another gear; and
   at least one bearing portion comprising:
      a collar portion allowing the rotation shaft to be inserted therethrough to rotatably support the rotation shaft; and
      a notched portion allowing a portion of the rotation shaft to be exposed to an outside, the notched portion being formed by partially cutting away the collar portion,
   wherein the at least one bearing portion has a first region and a second region opposite the first region with respect to a first imaginary plane, the first region and the second region being defined by dividing the bearing portion by the first imaginary plane, the first imaginary plane extending in the axial direction and containing a first linear line, the first linear line passing through a center of the rotation shaft inserted through the collar portion and perpendicular to a direction of a line of action of the force, the first region being positioned downstream of the first linear line in the direction of the line of action of the force, and
   wherein the notched portion is formed in the second region and defines a gap length in a circumferential direction of the collar portion, the gap length increasing as going radially outward of the collar portion.

2. The gear mechanism according to claim 1, wherein the at least one gear comprises a plurality of gears, and
   wherein the at least one bearing portion comprises a plurality of bearing portions.

3. The gear mechanism according to claim 1, wherein the collar portion and the notched portion defines a first boundary and a second boundary therebetween, the first boundary being positioned upstream of the second boundary in a rotational direction of the rotation shaft inserted through the collar portion, and
   wherein the at least one bearing portion is formed with a grease retaining portion, the grease retaining portion being provided in the first boundary so as to be continuous with the notched portion.

4. The gear mechanism according to claim 1, wherein the notched portion is positioned on the line of action of the force in the second region.

5. The gear mechanism according to claim 1, wherein the at least one bearing portion has a first portion and a second portion in the axial direction, the first portion being positioned farther from the gear body in the axial direction than the second portion is from the gear body,
   wherein the notched portion is formed in the first portion, and
   wherein the second portion surrounds an entire circumference of the rotation shaft.

6. A gear mechanism comprising:
   a first gear comprising a first gear body and a first rotation shaft extending in an axial direction;
   a second gear comprising a second gear body and a second rotation shaft extending in the axial direction, the second gear being capable of meshing engagement with the first gear, a force being applied to the first gear from the second gear due to the meshing engagement with the second gear;
   a first bearing portion comprising:
      a first collar portion allowing the first rotation shaft to be inserted therethrough to rotatably support the first rotation shaft; and
      a first notched portion allowing a portion of the first rotation shaft to be exposed to an outside, the first notched portion being formed by partially cutting away the first collar portion,
   wherein the first bearing portion has a first region and a second region opposite the first region with respect to a first imaginary plane, the first region and the second region being defined by dividing the first bearing portion by the first imaginary plane, the first imaginary plane extending in the axial direction and containing a first linear line, the first linear line passing through a center of the first rotation shaft inserted through the first collar portion and perpendicular to a direction of a line of action of the force, the first region being positioned downstream of the first linear line in the direction of the line of action of the force, and
   wherein the first notched portion is formed in the second region; and
   a second bearing portion comprising:
      a second collar portion allowing the second rotation shaft to be inserted therethrough to rotatably support the second rotation shaft; and
      a second notched portion allowing a portion of the second rotation shaft to be exposed to an outside, the second notched portion being formed by partially cutting away the second collar portion,
   wherein a second force is applied to the second gear from the first gear due to the meshing engagement with the first gear,
   wherein the second bearing portion has a third region and a fourth region opposite the third region with respect to a second imaginary plane, the third region and the fourth region being defined by dividing the second bearing portion by the second imaginary plane, the second imaginary plane extending in the axial direction and containing a second linear line different from the first linear line, the second linear line passing through a center of the second rotation shaft inserted through the second collar portion and perpendicular to a direction of a line of action of the second force, the third region being positioned down stream of the second linear line in the direction of the line of action of the second force, and wherein the second notched portion is formed in the fourth region.

7. The gear mechanism according to claim 6, wherein the first notched portion defines a gap length in a circumferential direction of the first collar portion, the gap length increasing as going radially outward of the first collar portion.

8. The gear mechanism according to claim 6, wherein the first collar portion and the first notched portion defines a first boundary and a second boundary therebetween, the first boundary being positioned upstream of the second boundary in a rotational direction of the first rotation shaft inserted through the first collar portion, and wherein the first bearing portion is formed with a grease retaining portion, the grease retaining portion being provided in the first boundary so as to be continuous with the first notched portion.

9. The gear mechanism according to claim 6, wherein the first notched portion is positioned on the line of action of the force in the second region.

10. The gear mechanism according to claim 6, wherein the first bearing portion has a first portion and a second portion in the axial direction, the first portion being positioned farther from the first gear body in the axial direction than the second portion is from the first gear body, wherein the first notched portion is formed in the first portion, and wherein the second portion surrounds an entire circumference of the first rotation shaft.

11. A gear mechanism comprising:

at least one gear comprising a gear body and a rotation shaft extending in an axial direction, the at least one gear being capable of meshing engagement with another gear, a force being applied to the at least one gear from the another gear due to the meshing engagement with the another gear; and at least one bearing portion comprising:

a collar portion allowing the rotation shaft to be inserted therethrough to rotatably support the rotation shaft; and a notched portion allowing a portion of the rotation shaft to be exposed to an outside, the notched portion being formed by partially cutting away the collar portion, wherein the at least one bearing portion has a first region and a second region opposite the first region with respect to a first imaginary plane, the first region and the second region being defined by dividing the bearing portion by the first imaginary plane, the first imaginary plane extending in the axial direction and containing a first linear line, the first linear line passing through a center of the rotation shaft inserted through the collar portion and perpendicular to a direction of a line of action of the force, the first region being positioned downstream of the first linear line in the direction of the line of action of the force, wherein the notched portion is formed in the second region, wherein the at least one bearing portion has a first portion and a second portion in the axial direction, the first portion being positioned farther from the gear body in the axial direction than the second portion is from the gear body, wherein the notched portion is formed in the first portion, and wherein the second portion surrounds an entire circumference of the rotation shaft.

* * * * *